US005923264A

United States Patent [19]

Lavelle et al.

[11] Patent Number: 5,923,264

[45] Date of Patent: Jul. 13, 1999

[54] MULTIPLE ACCESS ELECTRONIC LOCK SYSTEM

[75] Inventors: Gary E. Lavelle, Avon; Peter S. Conklin, Simsbury; Brian D. Hass, Meriden; John E. Walsh, III, Bristol, all of Conn.

[73] Assignee: Harrow Products, Inc., Grand Rapids, Mich.

[21] Appl. No.: 08/577,267

[22] Filed: Dec. 22, 1995

[51] Int. Cl.[6] .......... G06K 9/00

[52] U.S. Cl. .......... 340/825.31; 340/825.34; 340/542; 340/543; 340/545; 70/278; 235/375; 235/380; 235/382; 235/382.5

[58] Field of Search .......... 340/825.31, 825.34, 340/542, 543, 545, 825.3, 825.32, 636; 70/275, 276, 277, 278; 235/375, 380, 382, 382.5; 455/343

[56] References Cited

U.S. PATENT DOCUMENTS

| | | | |
|---|---|---|---|
| 3,516,701 | 6/1970 | Graham | 292/144 |
| 4,163,215 | 7/1979 | Iida | 340/825.31 |
| 4,177,657 | 12/1979 | Aydin | 70/278 |
| 4,298,792 | 11/1981 | Granholm et al. | 235/375 |
| 4,509,093 | 4/1985 | Stellberger | 361/172 |
| 4,633,687 | 1/1987 | Fane | 70/276 |
| 4,634,846 | 1/1987 | Harvey et al. | 235/382 |
| 4,909,053 | 3/1990 | Zipf, III et al. | 70/283 |
| 4,967,305 | 10/1990 | Murrer et al. | 361/172 |
| 4,972,182 | 11/1990 | Novik et al. | 340/825.32 |
| 5,065,136 | 11/1991 | Frolov et al. | 340/545 |
| 5,083,122 | 1/1992 | Clark | 340/825.32 |
| 5,204,663 | 4/1993 | Lee | 340/825.34 |
| 5,245,329 | 9/1993 | Gokcebay | 340/825.31 |
| 5,437,174 | 8/1995 | Aydin | 70/278 |
| 5,473,236 | 12/1995 | Frolov | 318/286 |
| 5,608,298 | 3/1997 | Frolov et al. | 318/286 |
| 5,617,082 | 4/1997 | Denison et al. | 340/825.31 |

OTHER PUBLICATIONS

Locknetics brochure entitled "CM5000 Computer Managed Locking Systems" dated prior to Dec. 22, 1995.

*Primary Examiner*—William A. Cuchlinski, Jr.
*Assistant Examiner*—Yonel Beaulieu
*Attorney, Agent, or Firm*—Alix, Yale & Ristas, LLP

[57] ABSTRACT

An electronic door security system employs an input console having two readers for enhanced security. A microprocessor processes inputs applied at each of the readers to selectively permit access through a secured door. Application of an input to either reader transforms the controller to a power-up mode.

17 Claims, 7 Drawing Sheets

MULTIPLE ACCESS ELECTRONIC LOCK SYSTEM

BACKGROUND OF THE INVENTION

This invention relates to the field of electronic door locks. More particularly, this invention relates to a multiple reader stand-alone door lock system for securing a door.

It is known in the field of electronic door locks to use a stand-alone electrically controlled lock to secure the door to a door frame. Such locks typically employ an access code system to permit selective operation of the electrically controlled lock. The access code system generally has a single code reader device for receiving an access code from a user of the door. The access code system can be a key pad or a card reader. The door lock stores valid user codes. Entry of a valid user access code at the reader unlocks the door lock to permit access.

Electrically controlled door locks have found acceptance in business and university settings. For example, a door lock system may secure a dormitory room. Each resident of the room is issued an individual valid access code for the particular lock that secures the room. For safety and maintenance reasons, it is also required that security and maintenance personnel be able to access the dormitory room. Therefore, each safety or maintenance person is also issued an individual access code for the door lock. Due to the large number of secured doors at a university, it is generally required that a single universal code be available to each safety or maintenance person to permit entry to large blocks of secured doors. If, however, the universal code is compromised, unauthorized personnel can gain entry to a large number of secured areas. Security problems are complicated by the multiple overlapping universal codes which allow access to blocks of overlapping secured areas.

It is generally preferred that security and maintenance personnel have a universal code unique to each individual. Therefore, for an individual door lock system, the individual system will unlock not only for residents of the dormitory room, but also the lock will unlock for a large number of additional universal codes. The greater the number of valid codes for a particular doorway, the greater the possibility that random entry of access codes will release the lock. When a universal code has been compromised, all the doors within a block or on the system must be individually reprogrammed to delete the old universal code and enter a new universal code.

When a universal code has been compromised, unauthorized personnel can readily enter large blocks of secured areas. To alleviate these and other deficiencies, door lock systems to which the invention relates have employed card readers, contact activatable readers or other electronic devices that cause the lock to release for access when a proper "key" is employed. The "key" may be a magnetic card, microchip contact device or other electromagnetic device. A deficiency of "key" systems is that in a university setting, students frequently lock themselves out of their rooms when they fail to carry the "key" or the "key" is misplaced, lost or stolen. Security personnel can spend a significant portion of time unlocking doors, electronically rekeying the lock system and replacing lost keys.

SUMMARY OF THE INVENTION

Briefly stated, the invention in a preferred form relates to a multiple access stand-alone electronic door lock assembly. The electronic lock assembly preferably mounts to a door having a latch which is actuatable by a handle or knob at either side of the door. The interior door handle typically actuates to release the latch under all circumstances. An electrically operated locking mechanism permits selective operation of the latch via the exterior door handle.

The electronic lock assembly comprises a lock controller and multiple access code readers. The lock controller and the access code readers are powered from an on-board power source, such as a battery source. The lock controller is programmable and has an associated memory. The memory stores valid access codes for comparison with access codes entered into either of the readers.

One of the readers is preferably a keypad. The keypad receives personal access codes. The second reader is an electronic "key" reader, such as a card reader, a contact activatable reader port and/or a computer data port which also receives a personal access code.

The lock controller compares an entered user access code from either reader to corresponding valid user access codes stored in the lock controller memory. An appropriate comparison causes the lock controller to generate a signal to the locking mechanism that places the door in an unlocked state. The electronic lock assembly of the invention is responsive to either entry of a personal access code at the key pad or contact by an electronic "key" at the electronic reader.

In one preferred application for security systems having a large number of secured doors, such as a dormitory at a university setting, a student would be provided with a personal access code to permit entry by using the key pad for the assigned dormitory room. Security and maintenance personnel could obtain entry to blocks of rooms by use of the appropriate electronic "key". If an individual student's personal access code is compromised, only a single or a small number of locks require reprogramming with a new code in order to reestablish a secure environment. Any possible unauthorized entries would be restricted to a small number of secured areas. Furthermore, students would not be able to lock themselves out of their dorm room since no actual device would be required to obtain entry. This advantage frees security personnel from responding to lock-outs and replacing lost keys. The small number of electronic keys held by security or maintenance personnel reduces the possibility of unauthorized entry.

The door lock system further embodies power saving functions for the on-board battery power supply to permit extended operation of the door lock system. In particular, the lock controller has two operational modes, a powered down mode and an active mode. When the lock system is in the powered down mode, the lock system components place a minimal current draw on the battery source. Contact with the key pad or electronic reader device transforms the lock controller from the powered down mode to the active mode. In the active mode, the lock controller scans the readers for an access code, process the electronic inputs, generates various lock commands, and records appropriate data. A low current motor is employed in the locking mechanism to further conserve battery power.

An object of the invention is to provide a new and improved electronic door security system having enhanced security features.

Another object of the invention is to provide a new and improved electronic door security system which employs two different readers for obtaining access to a secured area.

A further object of the invention is to provide a new and improved electronic door security system which incorporates a key pad and an electronic key reader.

Other objects and advantages of the invention will become apparent from the drawings and the specification.

DETAILED DESCRIPTION OF THE PREFERRED EMBODIMENT

Figure 1:
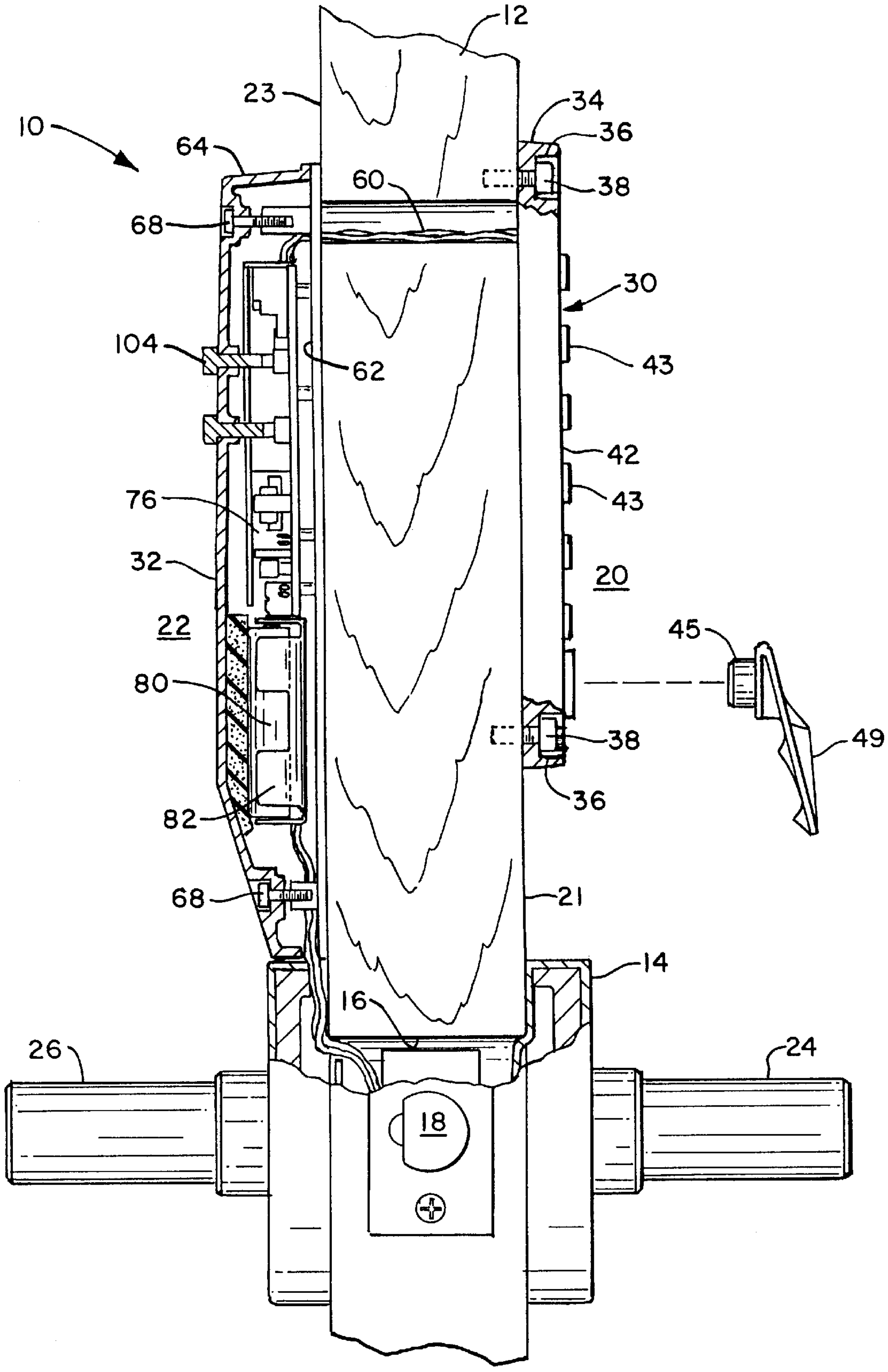
FIG. 1 is a side view, partly in section, partly broken away and partly in schematic, of an electronic lock assembly in accordance with the present invention in association with a portion of a door, a latch assembly and an electronic key.
Figure 2:
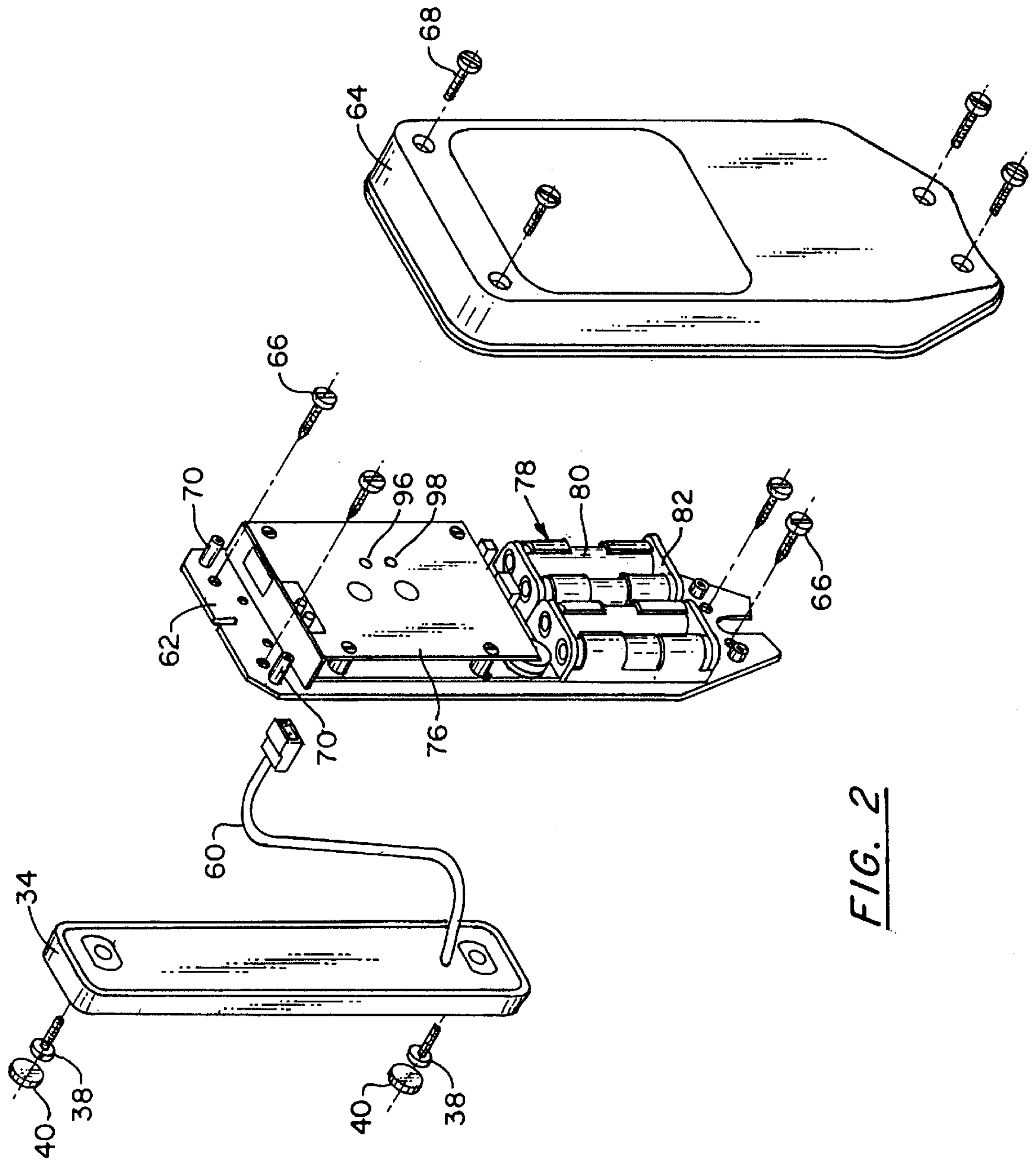
FIG. 2 is an exploded isometric view of a portion of the electronic lock assembly of FIG. 1.
Figure 3C:
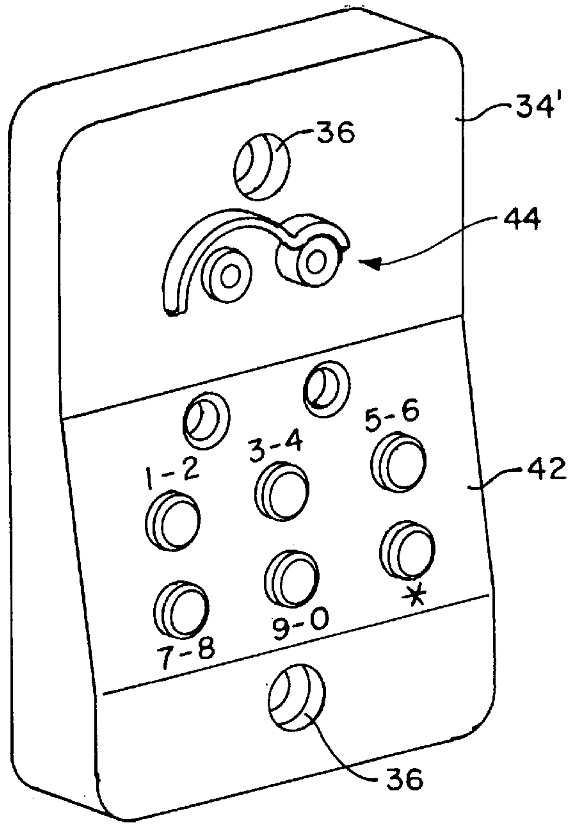
FIG. 3*c* is an isometric view of an alternative embodiment of the frontal assembly of FIG. 3*a;*
Figure 3A:
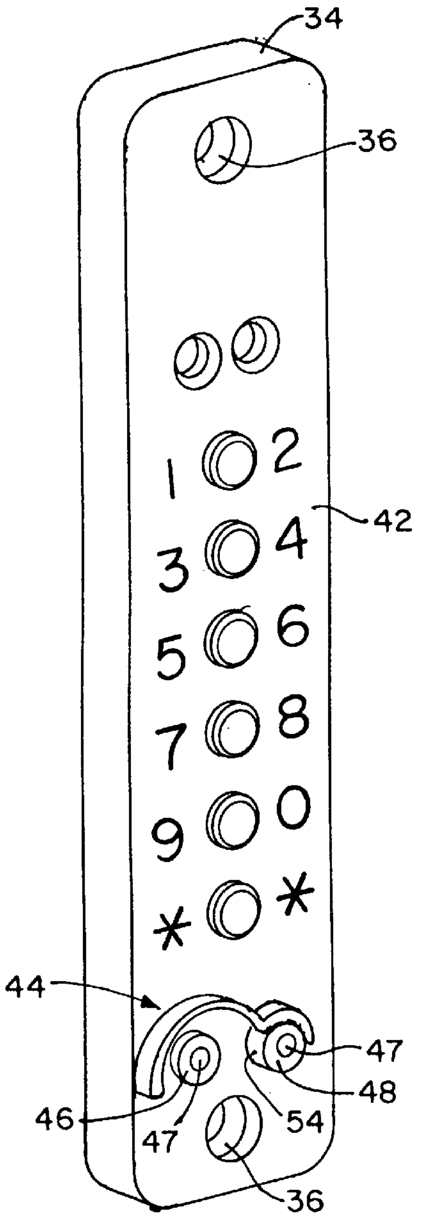
FIG. 3*a* is an isometric view of the frontal assembly of the electronic lock assembly of FIG. 1 viewed from the right thereof.
Figure 3B:
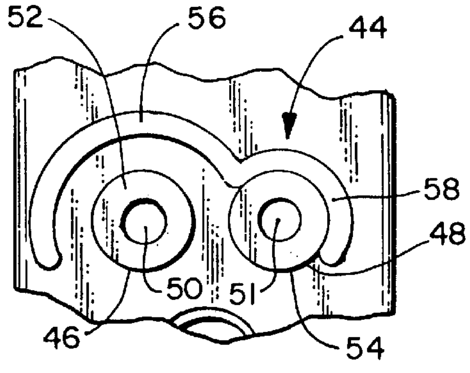
FIG. 3*b* is an enlarged fragmentary view of an electronic data reader of FIG. 3*a;*
Figure 4:
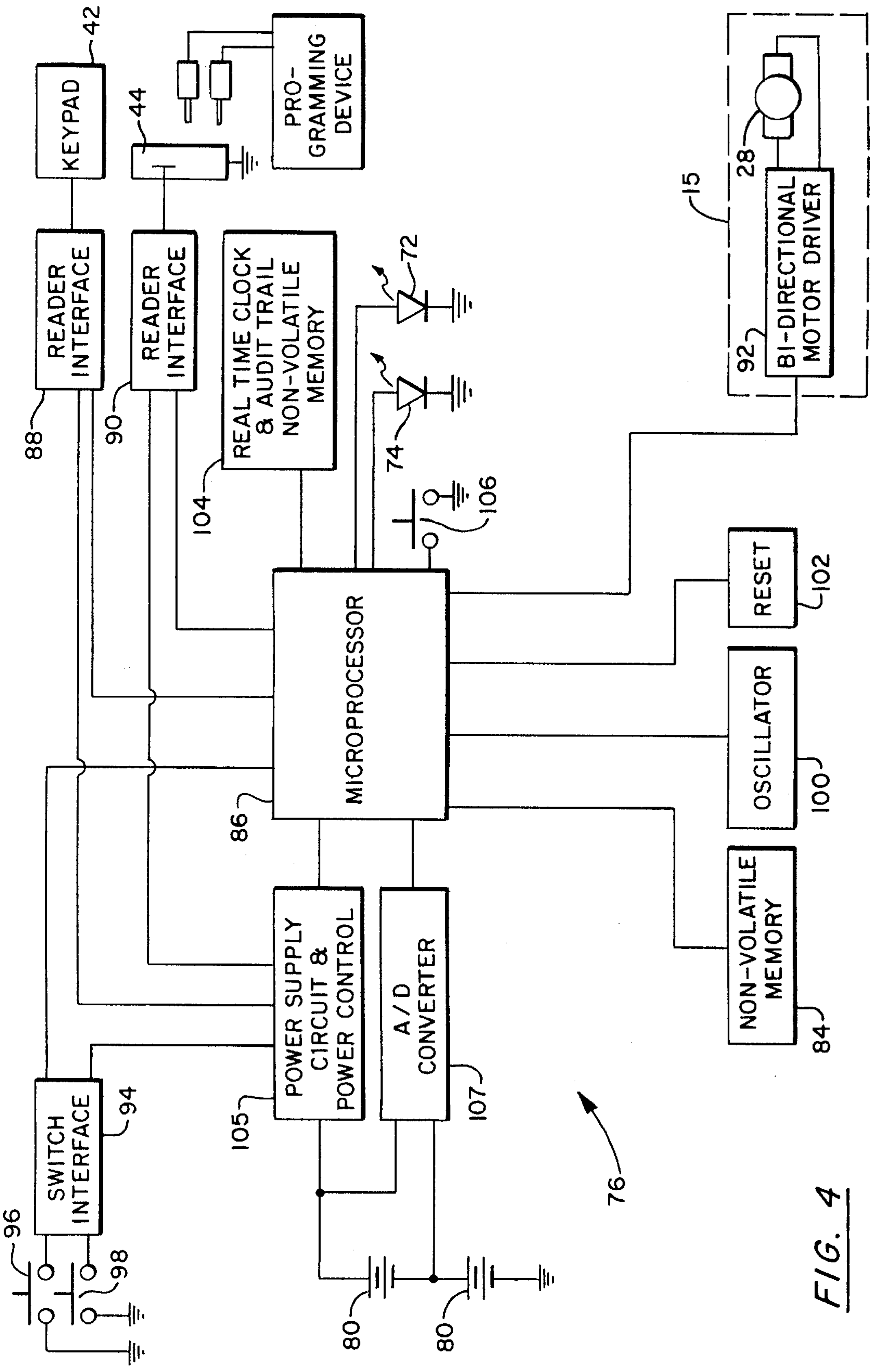
FIG. 4 is a schematic block diagram of the electronic lock assembly of FIG. 1.

With reference to the drawings wherein like numerals represent like parts throughout the Figures, an electronic lock assembly in accordance with the present invention is generally designated by the numeral 10. The electronic lock assembly 10 is adapted for mounting to a door 12. An electrically actuated cylindrical lock 14 is mounted in a circular throughbore 16 in the door 12. The cylindrical lock 14 secures the door 12 via a latch 18 which engages a strike mounted to the door frame. For purposes of illustration, the door 12 has a secured or exterior side 20 and an unsecured or interior side 22. The latch 18 is actuatable from either side of the door by an interior handle 26 and an exterior handle 24. The handles 24, 26 may assume various forms including levers as illustrated, knobs or other well-known door hardware.

The electronic lock assembly 10 has applications for a wide variety of doorway and lock set configurations including installations for mortise locks, cylinder locks and other electrically controlled lock assemblies. The interior handle 26 is preferably free to release the latch 18 under all circumstances. An electrically controlled motorized drive unit 15 includes a motor 28 for operating the cylindrical lock 14 to selectively lock the latch 18 and thereby prevent the exterior handle 24 from actuating the latch 18 for release.

The electronic lock assembly 10 comprises a frontal subassembly 30 which mounts against the exterior door face 21 and a cooperative rear assembly 32 which mounts against the interior door face 23. The frontal subassembly 30 includes an input console which incorporates at least a pair of two different types of access code readers. In preferred form, one of the readers requires a “key”, which may be an electronic chip, a card or other physical form, while the other reader is “keyless”. The access code readers are supported within a case 34 constructed of a tamper resistant material such as Lexan or stainless steel. The case 34 defines a pair of sockets 36. Fasteners 38 extend from the sockets 36 to secure the case 34 to the door 12. Anti-tamper plugs 40 fit over the fasteners 38 to prevent unauthorized removal of the frontal subassembly 30 from the door 12.

The case 34 preferably incorporates an externally accessible key pad 42 and a contact activatable electronic reader 44. A first personal access code is entered in the electronic lock assembly 10 by selectively sequentially depressing keys 43 on the key pad 42. A second personal access code may be entered at the electronic reader 44. Preferably the contact activatable electronic reader 44 is a contact activatable dataport such as a 780 series Touch Entry access control systems of Locknetic Security Engineering of Forestville, Conn. Access through the door 12 by use of the electronic reader 44 is obtained via an electronic key in the form of an encased ROM chip 45 having a valid preestablished code. The reader also defines a pair of computer jacks 47 so that the electronic reader 44 accepts not only access code input through the contact activatable dataport, but also functions as a communication port to facilitate programming and downloading of the electronic lock assembly via a computer.

The electronic reader 44 has a unique configuration which comprises a first contact 46 and an elevated second contact 48. Each contact defines a corresponding jack opening 50, 51 for receiving male plug-in jacks from a computer. The first contact 46 defines a horizontal conducting surface 52 which contacts with the generally planar surface of the bottom of the ROM chip 45. The elevated second contact 48 defines a vertical conducting surface 54 on the side of the contact. A locating shoulder 56 coaxial with the first contact 46 has a radius substantially equal to the radius of the contact activatable ROM chip 45. The chip 45 is mounted to a fob 49 to facilitate usage. The shoulder 56 locates the ROM chip 45 in conducting contact with the horizontal contact surface 52 of the first contact and the vertical contact surface 54 of the second contact. A second shoulder 58 is coaxially positioned around the second contact 48 and has a radius substantially equal to that of the outer radius of the contact 48. The height of the shoulders 56, 58 is generally equal to the height of the elevated contact 48. The contact surface 52 of the first contact is conductively connected to the computer jack opening 50. The contact surface 54 of the second contact is conductively connected to the computer jack opening 51.

Communication wires 60 carry electrical signals between the frontal assembly 30 and the rear assembly 32. A red indicator LED 72 and a green LED indicator 74 for indicating the lock status are provided at the front assembly 30.

The rear assembly 32 has a mounting plate 62 and a cover 64. The mounting plate 62 is secured to the interior door surface 23 by fasteners 66, preferably wood screws. The cover 64 is mounted to the support plate 62 by screws 68 threadably engaging the studs 70 affixed to the support plate 62.

The mounting plate 62 supports a lock controller 76 and a power source 78. The power source for the electronic lock assembly 10 is a set of batteries 80 mounted in parallel relationship to battery holders 82. The battery holders 82 are affixed to the support plate 62.

The lock controller 76 is a programmable microprocessor driven system for controlling the cylindrical lock 14 via the electrical motorized drive unit 15 in response to access codes and computer commands entered at the readers 42, 44. The lock controller comprises a microprocessor 86, such as, for example, a Motorola 68HC05 microprocessor. The microprocessor 86 communicates with the keypad 42 via a keypad reader interface 88 and with the electronic reader 44 via an electronic reader interface 90. The microprocessor 86 has an associated on-board memory 84. The memory 84 can be programmed to store valid personal access codes and valid "key" access codes. The microprocessor 86 receives personal access codes and "key" access codes from the readers 42, 44 through the reader interfaces 88, 90 and compares those access codes to corresponding valid access codes stored in the memory 84. If correspondence is found between an entered access code and a valid access code stored in the memory 84, the microprocessor sends a release signal to the drive unit 15 which actuates the low current motor 28 through a bidirectional motor driver 92 to place the cylindrical lock 14 in an unlocked state. The microprocessor also generates signals to the LED indicators 72, 74 indicative of lock status. The drive unit 15 may be similar in form and function to that disclosed in U.S. application Ser. No. 08/275,301 filed Jul. 14, 1994, the disclosure of which is incorporated by reference.

The lock controller 76 includes a switch interface 94 that clears the memory of the microprocessor 86 and initiates a program mode by use of a reset switch 96 and an initiate program switch 98. The microprocessor 86 and various functions are synchronized by an oscillator 100. A power-on reset circuit 102 also provides an input to the microprocessors 86 to commence the operating mode. A real-time clock and audit trail memory 104 communicate with the microprocessor to record the chronological history of each attempted lock/unlock event and the associated access code entered. A privacy button 106 mounted to the rear assembly and accessible at the secured side of the door can also be included to prevent actuation of the lock from the exterior side regardless of the input entered at the readers 42, 44.

An important consideration for the stand-alone lock systems is low power consumption in order to obtain long battery life. The microprocessor 86 and other associated electronic components of the electronic lock system 10 are powered through a power supply circuit and power control 105 and an A/D converter 107. In order to conserve battery power, the microprocessor 86 has two operational modes. The first passive mode, which is the normal state for the system, is a power down mode wherein the microprocessor and other components of the system draw a minimal current from the batteries 80. Upon the initial attempt to enter an input in one of the readers 42, 44, the system powers up to an active mode in order to perform the lock and security functions. Power is further conserved by using a low current motor 28 of the drive unit 15 for the cylinder lock.

Figure 5:
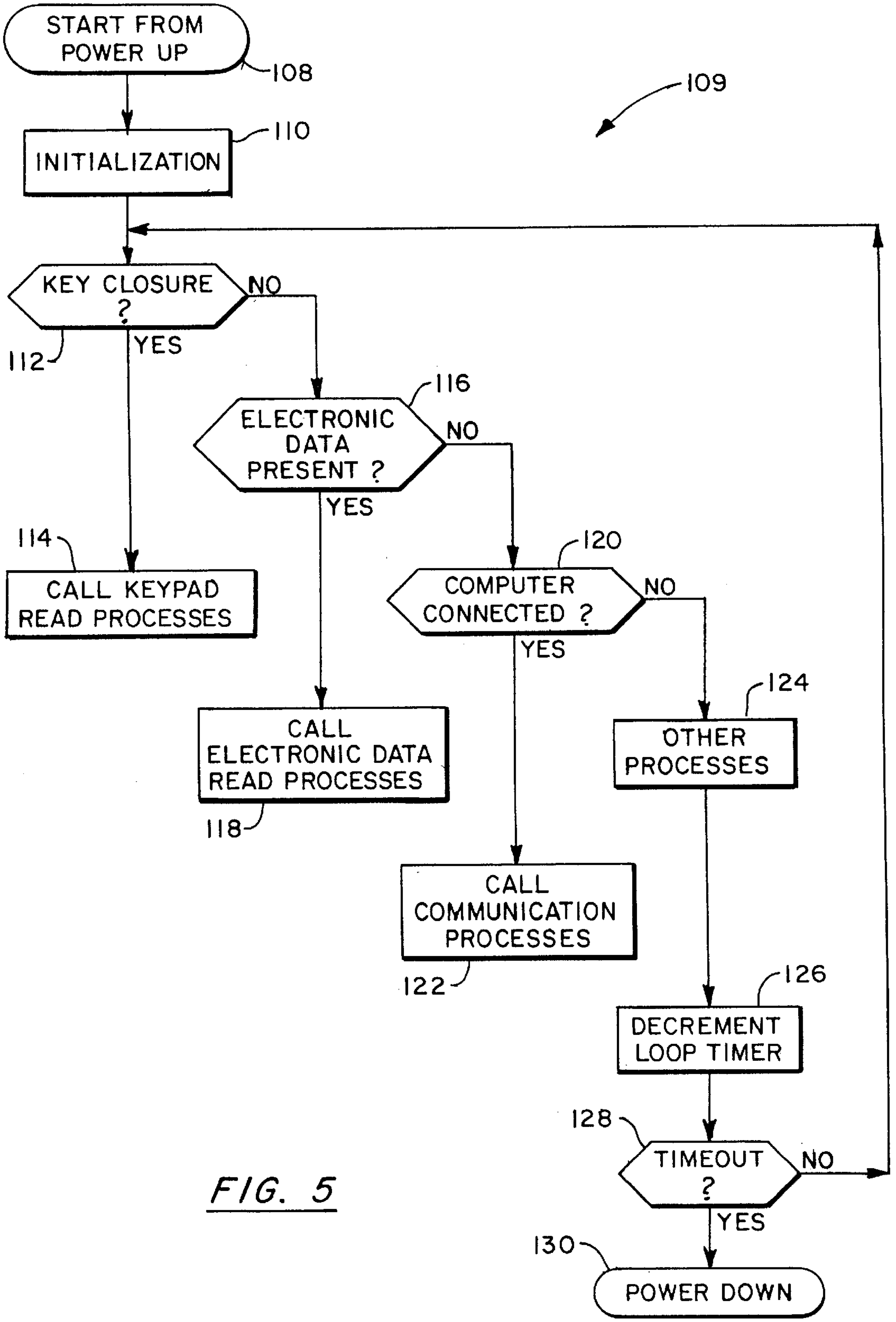
FIG. 5 is a flow diagram of the main operating routine of the electronic lock system of FIG. 1.
Figure 6:
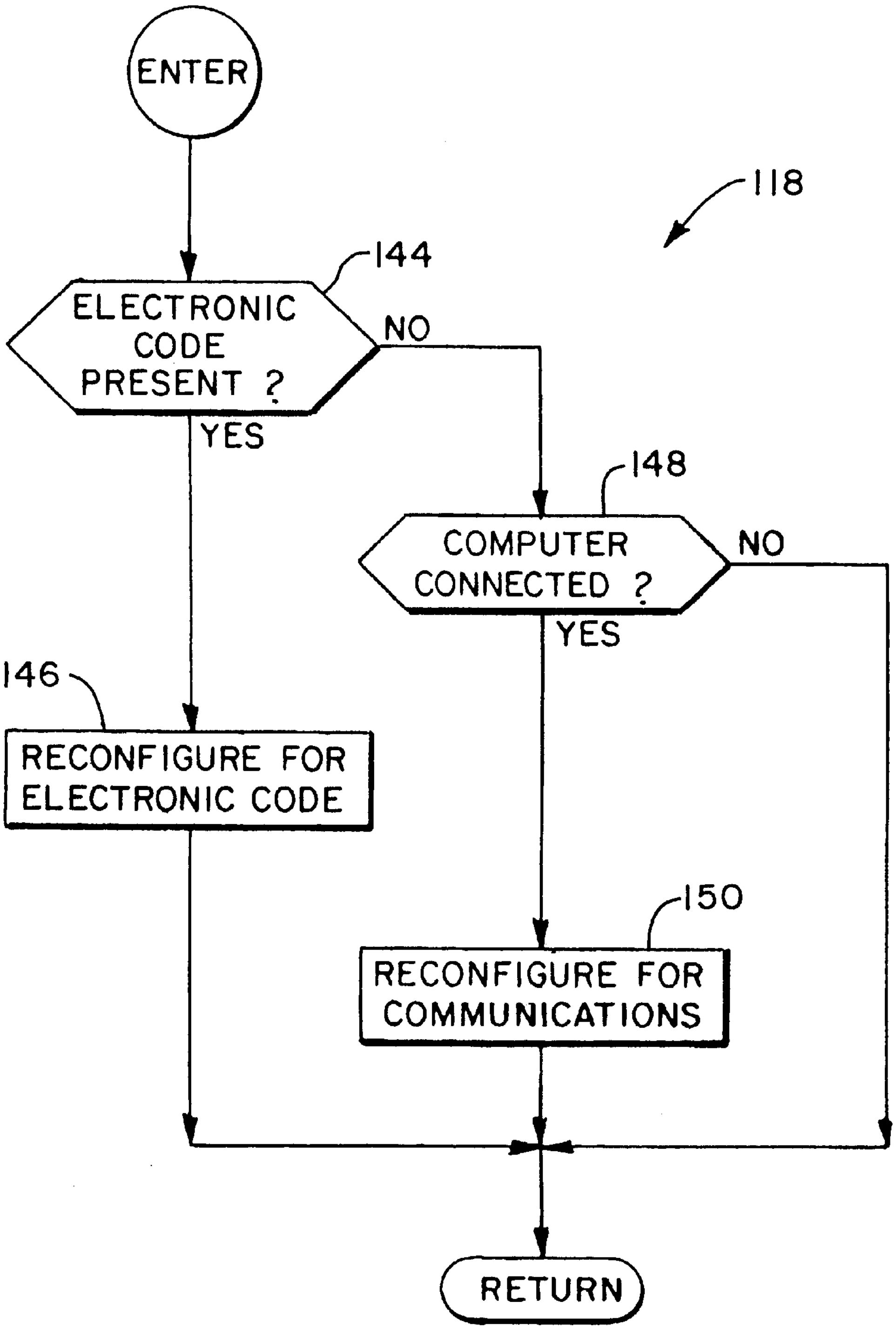
FIG. 6 is a flow diagram of the call key pad read processes subroutine of the main routine of FIG. 5.
Figure 7:
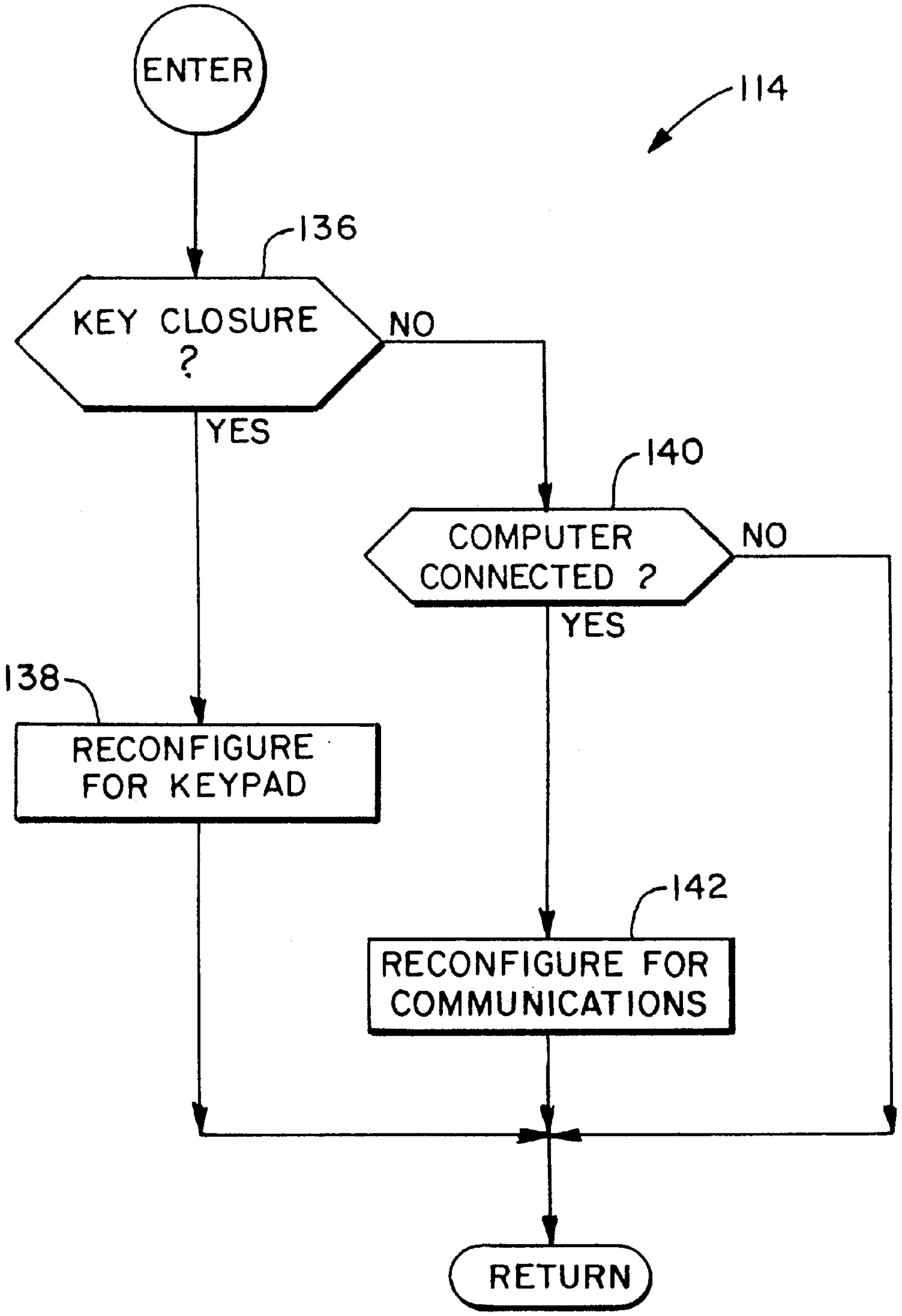
FIG. 7 is a flow diagram of the call electronic data read processes subroutine of the main routine of FIG. 5.

The processing steps are illustrated by the flow diagrams of FIGS. 5–7. An initial contact at either of the readers generates a power-up command 108 and an initialization step 110 of the main program routine 109 of the microprocessor 86. (See FIG. 5.) The microprocessor 86 processes the input from the key pad 42 or the electronic reader 44 and automatically transforms from one processing state to the other state "on the fly" in response to an attempt to enter an input at a given reader.

A key closure test 112 is undertaken to identify if the initial contact was a key closure on the key pad 42. This is typically detected as a low signal. In the event that the initial contact is a key closure, the routine 109 executes a call key pad read process subroutine 114 (FIG. 7). During the key closure subroutine 114, the microprocessor 86 continuously undertakes a key closure test 136 and also tests for data chip input at reader 44 and computer connection through jacks 47. In the event that a key closure has occurred, the microprocessor executes reconfigure subroutine 138 to process the electronic input from the key to thereby read the key pad switches and conform the data to a key pad code format. When all of the key pad entries are completed, the system returns to the main routine 109. If no key closure has occurred, the subroutine 114 undertakes a test 140 to determine if a computer is connected for communication with the microprocessor 86. The test 140 may typically seek to identify a string of three bytes within an 80 milliseconds window which uniquely identifies the computer. When a computer is connected, the microprocessor 86 executes a reconfigure subroutine 142 to receive lock commands and/or changes to valid access codes, and to down load from the audit trail memory 104 an audit trail of lock usage. In the event that no computer communication is detected, or when the lock completes programming, the subroutine returns to the main routine 109. If no activity occurs within 5 seconds, then the controller powers down.

If no key closure has occurred, the lock controller next executes a test 116 to determine if a data chip input is present. The data chip communicates serially. The reader typically has a 5 volt power base and upon contact powers up, transmits a reset signal and waits for a presence signal from the data chip. If the input is present, the microprocessor operates a call read process subroutine 118. The call read process subroutine 118 undertakes a test 144 to determine if an electronic "key" has contacted the reader 44 and therefore a data chip is present. When the data chip or input key is present, the microprocessor 86 executes a reconfigure subroutine 146 to read the data key information. The reader 44 generates a serial binary command signal to read the serial number of the key and to accept data from the key within a pre-established time slot. Typically a 64 bit signal is transmitted. When the data key entries are completed, the subroutine 118 returns to the main routine 109. If no electronic input has occurred, the subroutine 118 executes a test 148 similar to test 140 to determine if the computer is connected for programming and down loading 148. The microprocessor 86 executes a subroutine 150 for receiving, processing, and downloading information if the computer is connected. After completion of programming or downloading, the subroutine 118 returns to the main routine 109. Should neither a key closure nor an electronic key be detected, the microprocessor 86 executes a test 120 to determine if the computer is connected and executes a call communication process subroutine 122 to implement communication between the computer and processor if the computer is connected.

The system can also default to look for other entry code or programming processes 124 and begin a decrement loop timing process 126. The system cycles through a time out test 128 until no more input information is detected and the system executes a power down command 130 to conserve power.

The microprocessor 86 proceeds to compare the input from the key pad with each of the valid personal access codes which are stored in the memory. If there is a match, then a release signal is generated to the drive unit 15 for releasing the latch. The processor also automatically records various data, including the input code and the time, in the audit trail. Likewise, the electronic code from the data chip is also compared to each of the valid electronic codes stored in the memory and if a match is obtained, a release signal is transmitted to the drive unit for releasing the latch. Various data is also recorded in the audit trail. It should be appreciated that in some embodiments the privacy button 106, which can be activated at a secured side of the door, may override or disable the release signals even when there is a valid code entered at the input console.

In summary, the lock controller 76 of the invention places the cylindrical lock 14 in an unlocked mode upon entry of a valid personal access code via the key pad 42. The personal access code comprises an individual code entered by the door user by sequentially pressing the selected buttons on the keypad 42. Entry can also be obtained by use of an electronic or magnetic key, preferably an electronic key contacting the electronic reader 44. In large systems employing large numbers of the stand alone lock system of the invention, each door user would be given a unique numerical code that would permit authorized entry through a particular number of doors. For security and other personnel that require access through all doorways, these personnel would be issued electronic keys.

The electronic lock assembly of the invention can also be configured to unlock only on entry of both a personal access code and an electronic access code with the electronic reader. An advantage of this configuration is that unauthorized procurement of either a personal access code or an electronic device will not actuate the electronic lock assembly 10 to release the latch. The dual requirement for authorized entry can be required for all persons attempting to use the system or only for certain door lock users such as security personnel.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A door security system comprising:

latch means for latching a door;

lock operator means for selectively locking and unlocking said latch means;

an input console comprising:

first reader means comprising a key pad for receiving a personal access code;

second reader means for receiving an electronic code from a coded key;

controller means for controlling said operator means, said controller means having a powered down mode for power conservation, and an active mode, and said controller means being transformed to the active mode upon applying an input at one of said first reader means and said second reader means, said controller means comprising:

memory means for storing at least one valid personal access code and at least one valid electronic code;

processor means communicating with said memory means and said first reader means and said second reader means for processing information in one of at least a first processing mode and a second processing mode and automatically switching between said first and second processing modes in response to detecting inputs at said first reader means or said second reader means wherein in said first processing mode said processing comprises identifying a personal access code input at said first reader means, comparing said personal access code to at least said one valid access code and generating a first RELEASE signal in response to a positive comparison and, in said second processing mode said processing comprises identifying an electronic code input at said second reader means, comparing said electronic code to at least said one valid electronic code and generating a second RELEASE signal in response to a positive comparison, wherein said operator means is responsive to said first and second RELEASE signals.

2. The door security system of claim 1 wherein said second reader means is a contact activatable data port.

3. The door security system of claim 2 wherein said second reader means further comprises means defining computer jack openings.

4. The door security system of claim 1 wherein said second reader means comprises a first contact defining a first contact surface, a second contact spaced from said first contact at a first distance and elevated from said first contact, said second contact defining a second contact surface generally orthogonal to said first contact surface, and a semicircular shoulder spaced from said first contact a distance commensurate with said first distance.

5. The door security system of claim 4 wherein said first and second contacts further comprise means defining computer jack openings.

6. The door security system of claim 1 wherein said lock operator means comprises a low current motor.

7. The door security system of claim 1 wherein said memory means is programmable to add and remove valid personal access codes and valid electronic codes.

8. The door security system of claim 1 further comprising on-board power means for powering said security system.

9. The door security system of claim 1 wherein said input console further comprises an indicator light for indicating lock status.

10. A door security system comprising:

lock operator means for selectively locking and unlocking a latch assembly;

an input console comprising:

first reader means for receiving a first input code;

second reader means for receiving a second input code; and controller means for controlling said operator means, said controller means having a powered down mode for power conservation and an active mode, and said controller means transforms from said powered down mode to said active power mode upon application of an input to one of said first reader means and said second reader means, said controller means comprising:

memory means for storing a set of valid first codes and a set of valid second codes;

processor means communicating with said memory means and said first reader means and said second reader means for processing information in a first processing mode and a second processing mode and automatically switching between said first and second processing modes in response to inputs at said first reader means or said second reader means wherein in said first processing mode said processing comprises identifying a first code input at said first reader means, comparing said first code to said set of valid first codes and generating a first RELEASE signal in response to a positive comparison and, in said second processing mode said processing comprises identifying a second code input at said second reader means, comparing said second code to said set of valid second codes and generating a second RELEASE signal in response to a positive comparison; and on-board power means for powering said operator means and said controller means, wherein said operator means is responsive to said first and second RELEASE signals.

11. The door security system of claim 10 wherein said first reader means comprises a key pad and said second reader means comprises an electronic contact activatable data port.

12. The door security system of claim 10 wherein said input console further comprises communication means for receiving a computer jack.

13. The door security system of claim 10 further comprising privacy means for disabling said first and second RELEASE signals.

14. A door security system comprising:

lock operator means for selectively locking and unlocking a latch assembly;

an input console comprising:

first reader means comprising a key pad for receiving a personal access code;

second reader means for receiving an electronic code from a coded key;

communication port means for communicating with a computer;

controller means for controlling said operator means, said controller means having a powered down mode for power conservation, and an active mode, and wherein said controller means is transformed to said active mode upon applying an input at one of said first reader means and said second reader means, said controller means comprising:

memory means communicatable with said communication port means for storing at least one valid personal access code and at least one valid electronic code;

processor means communicating with said memory means and said first reader means and said second reader means for processing information in at least a first processing mode and a second processing mode and automatically switching between said first and second processing modes in response to inputs at said first reader means or said second reader means wherein in said first processing mode said processing comprises identifying a personal access code input at said first reader means, comparing said personal access code to at least said one valid access code and generating a first RELEASE signal in response to a positive comparison and, in said second processing mode said processing comprises identifying an electronic code input at said second reader means, comparing said electronic code to at least said one valid electronic code and generating a second RELEASE signal in response to a positive comparison, wherein said operator means is responsive to said first and second RELEASE signals for unlocking the latch assembly.

15. The door security system of claim 14 wherein said coded key comprises a ROM chip.

16. The door security system of claim 14 further comprising privacy means for disabling said first and second RELEASE signals.

17. The door security system of claim 14 wherein said second reader means comprises a first contact defining a first contact surface, a second contact spaced from said first contact at a first distance and elevated from said first contact, said second contact defining a second contact surface generally orthogonal to said first contact surface, and a semicircular shoulder spaced from said first contact a distance commensurate with said first distance.

* * * * *